United States Patent [19]
Shaw

[11] 3,879,673
[45] Apr. 22, 1975

[54] CIRCULATING ACOUSTIC SURFACE WAVE

[75] Inventor: Herbert John Shaw, Stanford, Calif.

[73] Assignee: The Board of Trustees of Leland Stanford Junior University, Stanford, Calif.

[22] Filed: Mar. 10, 1971

[21] Appl. No.: 122,734

[52] U.S. Cl. ............... 330/5.5; 333/6; 333/30 R; 333/71; 333/72
[51] Int. Cl. ................ H03f 3/04; H03h 9/30
[58] Field of Search ......... 330/5.5; 333/6, 30 R, 71, 333/72

[56] References Cited
UNITED STATES PATENTS

| | | | |
|---|---|---|---|
| 2,712,638 | 7/1955 | Arenberg | 333/30 R |
| 3,500,461 | 3/1970 | Epstein et al. | 333/30 R |
| 3,609,602 | 9/1971 | De Vries et al. | 333/30 R |
| 3,634,774 | 1/1972 | Carr | 330/5.5 X |

OTHER PUBLICATIONS

White, Surface Elastic Waves, Proc. of the IEEE, August 1970, pp. 1238 and 1266 relied on.
Lakin et al., Surface Wave Delay Line Amplifiers, IEEE Trans. on MTT, Nov. 1969, pp. 912, 913 relied on TK 7800I23

Primary Examiner—Paul L. Gensler
Attorney, Agent, or Firm—Paul B. Fihe

[57] ABSTRACT

A circulating acoustic surface wave device including an elastic acoustic wave propagating medium formed so that the acoustic surface waves established by a suitably positioned transducer can propagate therearound one or more times.

15 Claims, 7 Drawing Figures

INVENTOR.
HERBERT JOHN SHAW

BY

Paul B. Fihe
PATENT AGENT

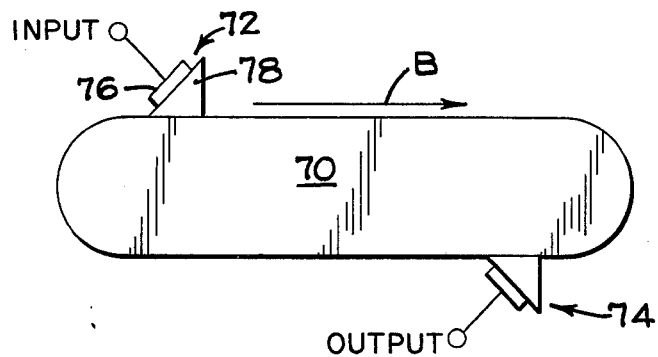
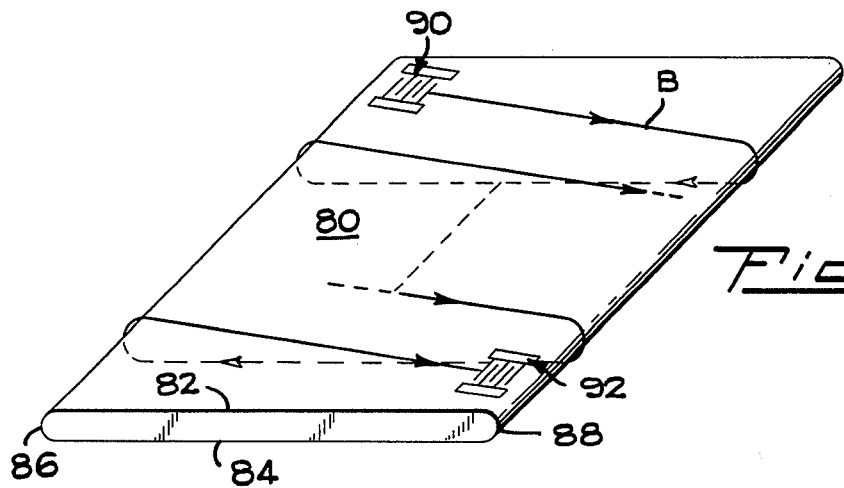
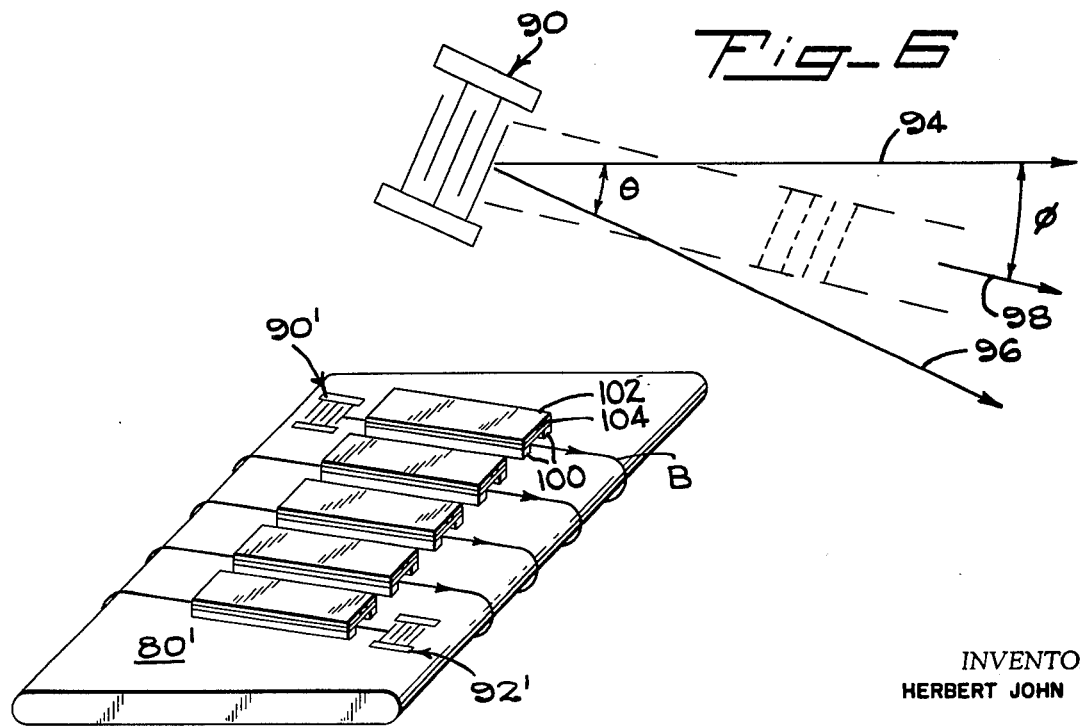
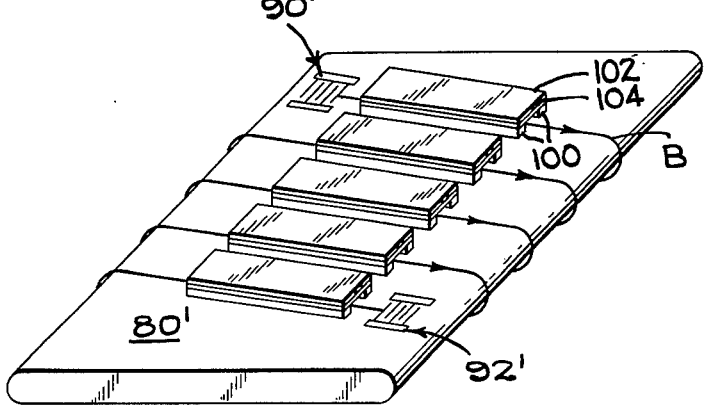

3,879,673

CIRCULATING ACOUSTIC SURFACE WAVE

FIELD OF THE INVENTION

The present invention relates generally to acoustic wave devices and more particularly, to a circulating acoustic surface wave device. The invention described herein was made in the course of work under a grant or award from the Department of Defense.

BACKGROUND OF THE INVENTION

Within the past few years, the development of acoustic wave devices has progressed rapidly both in university and industrial laboratories. While the development efforts have encompassed a variety of applications including amplifiers and filters, considerable investigative effort has been in the area of time delay mechanisms or "delay lines" as they are commonly referred to since they are theoretically capable of providing very large time-bandwidth products which, in turn, constitute a measure of the amount of information that can be stored and processed in any signal processing system. Thus, numerous applications in communications, navigation, data processing, radar, and sonar immediately are of significant interest.

In general terms, the time-bandwidth product of a signal processing system determines the amount of data that it can store at any time; for example, a time-bandwidth product of $10^5$ enables the storage of approximately $10^5$ bits of data. As one example, in a radar system, the time-bandwidth product constitutes a measure of the pulse compression ratio and the individual factors of bandwidth and time delay respectively represent the range resolution and Doppler resolution. Specifically, a bandwidth of 500 MHz leads to a compressed pulse width equal to the inverse of the bandwidth or two nanoseconds and a corresponding range resolution of approximately 1 foot, an exceedingly precise measurement.

With regard to data processing, a signal processing system with a bandwidth of 100 MHz can accept data at the very desirable rate of 100 megabits per second. However, such bandwidth requires operating frequencies of the order of 100 MHz and in this frequency range, existing systems capable of time-bandwidth products exceeding a few hundred are extremely rare.

In the case of acoustic surface wave devices, both large bandwiths and large time delays are theoretically possible. There is no inherent limit to the bandwidth of an acoustic surface wave in a piezoelectric crystal or other elastic propagating medium itself and the only real practical limitation has been imposed by the transducers which introduce the acoustic signal into the propagating medium. However, recent advances in the design of electro-acoustic transducers for acoustic surface waves, for example, as described in the article entitled, "DESIGN OF SURFACE WAVE DELAY LINES WITH INTERDIGITAL TRANSDUCERS," IEEE Transactions On Microwave Theory And Techniques, Volume MTT-17, No. 11, November 1969, pp. 865–873, now provide practical operating bandwidths in excess of 100 MHz.

With regard to the time factor, the relatively slow velocity of propagation of acoustic surface waves (approximately $3 \times 10^5$ cm./sec.) and the corresponding delay time per unit length of approximately 10 microseconds per inch indicates the theoretical possibility of extremely long time delays. However, an inherent practical limitation exists in the manufacture and processing of the acoustic propagating medium normally constituting either piezoelectric crystals such as lithium niobate, bismuth germanium oxide, and crystalline quartz, or non-piezoelectric elastic materials such as fused quartz, rutile, and sapphire of a size sufficient to attain desirable time-bandwidth design criteria. If such design criteria specify a time-bandwidth product of ten thousand, since the practically realizable bandwidths of 100 MHz are hypothesized, the requisite time delay will be approximately 100 microseconds and with existent crystals of the type mentioned hereinabove, an average length of approximately ten inches is required. Good elastic crystals of such length are very difficult to grow, process, and handle and accordingly are extremely expensive. Since such large crystals do not represent a practically acceptable solution, one alternative solution that has been proposed is to overlap a series of shorter crystals but the coupling between the overlapping crystals has been shown to considerably reduce the bandwidth in a fashion analogous to the well known bandwidth reduction in cascaded filters. A second alternative approach that has been explored involves the use of angular reflectors of the acoustic surface wave on a single crystal, such reflectors generally having the form of an interdigital electrode structure of the type used for transducers. However, such angular reflection is highly inefficient and a concomitant result is a greatly limited bandwidth. Thus, the problem of adequate time delay has not previously been solved, as a practical matter.

SUMMARY OF THE PRESENT INVENTION

It is the general objective of the present invention to provide a circulating acoustic surface wave device wherein a piezoelectric crystal or other elastic propagating medium is formed and the generated acoustic wave is directed so that the acoustic wave can propagate one or more times around the entire periphery of the medium thus to greatly extend the delay time attainable with a unit of any given dimensions. Briefly, such objective is achieved by forming the medium including highly polished curved surfaces with a certain minimal radius of curvature such that propagation of the acoustic surface wave can occur around the corner with negligible loss. It has been determined that generally surface waves (e.g. Rayleigh, Love, Stonely, and Lamb waves) can propagate around a corner if the radius of curvature merely exceeds a few acoustic wavelengths. More particularly, if a radius of curvature less than two acoustic wavelengths is provided, appreciable losses will occur and such radius of curvature should be considered as the practical minimum. With this as a general design criterion, it is obvious that the elastic medium could be of cylindrical form with an acoustic beam or column circulating around the periphery in a circular or helical path or as an obvious alternative, could have an elliptical configuration so long as no arcuate segment of the ellipse periphery is less than the designated minimal radius of curvature. As a further extrapolation, the propagating medium could constitute a flat plate-like structure having opposite faces connected by half cylinders or other connecting curved end configurations developed by a straight line generator which remains parallel to a given line which is, in turn, parallel to the faces of the plate during its generating motion. The latter configuration is of practical significance since piezoelectric crystals can be readily grown in the flat plate-like configuration and the flat surfaces as well as the curved end surfaces can readily be lapped to provide the requisite polished surface for propagating of the acoustic waves without significant loss or scattering.

Whether piezoelectric or non-piezoelectric materials are utilized for propagation of the acoustic wave, the required directional characteristics thereof can be attained by employment of a directional transducer to generate the acoustic wave. In the case of piezoelectric crystals, a broad bandwidth interdigital transducer of the type described and analyzed in an article entitled, ANALYSIS OF INTERDIGITAL SURFACE WAVE TRANSDUCERS BY USE OF AN EQUIVALENT SURFACE MODEL, by W. R. Smith, H. M. Gerrard, J. H. Collins, T. M. Reeder and H. J. Shaw appearing in IEEE Transactions On Microwave Theory And Techniques, Volume MTT-17, No. 11, November 1969, pp. 856–864, is preferably employed and is preferably applied to the surface either to provide a continuing recirculation of the acoustic wave, beam or column, in repetitive cycles along the same path in which case the fingers of the interdigital transducer are arranged in parallelism with the straight line generating the crystal configuration or alternatively, the transducer can be disposed at a slight angle so that the generated acoustic beam will follow a generally helical path so as to circulate a plurality of times around the crystal, each circulating beam segment lying substantially in parallelism to its neighbor and at a distance of the order of one width of the beam or column so as to avoid signal interference.

A single transducer can be employed in the recirculating system both to provide the input and output of the acoustic energy or two or more transducers can be employed to form essentially a multi-port tapped delay line, one transducer constituting the transmitter and the others forming receivers for the delayed energy, this arrangement being applicable either to the recirculation or helical circulating system. If simultaneous outputs at the multiple output ports or taps are observed, signal processing or analysis of a complex input waveform is enabled.

By the simple addition of an adjacent semiconductor in spaced relationship to the surface of the acoustic propagating piezoelectric crystal and the appropriate application of direct current energy so as to create drifting carriers parallel to the direction of propagation of the acoustic surface wave, amplification of the wave can be achieved in the general fashion described in the article entitled, SURFACE WAVE DELAY LINE AMPLIFIERS, by K. M. Lakin and H. J. Shaw appearing in the Nov. 1969 Transactions IEEE MTT-17, No. 11, pg. 912. Not only does such an arrangement provide an amplifier per se, but incorporated in the delay line, functions to suppress spurious echoes and eliminate the need for external amplification. Furthermore, it has been determined that the amplifying arrangement itself has a focusing effect so as to counteract spreading of the acoustic beam and to assist in steering the beam from the input to the output transducer.

In addition, whereas a standard two-port delay line existing on a single flat surface of a piezoelectric crystal has an inherent 6dB insertion loss and a maximum triple transit suppression of 12dB, appropriate disposition of the input and output transducers on a recirculating acoustic delay line of the general type discussed hereinabove will enable reduction of the insertion loss to zero and at the same time increase the triple transit suppression to infinity, apart from practical dissipative losses which operate the same in both systems.

As previously indicated, non-piezoelectric elastic crystals such as fused quartz, rutile, etc. can function as the acoustic propagating medium and a standard wedge transducer of the type described in the Viktorov text, RAYLEIGH AND LAMB WAVES, PHYSICAL THEORY AND APPLICATIONS, can be utilized to establish the acoustic wave.

Additionally, by appropriate design parameter choice, the basic circulating acoustic wave device can incorporate resonance characteristics, so that it will function as a narrow band filter.

BRIEF DESCRIPTION OF THE DRAWINGS

The stated objective of the invention and the manner in which it is achieved as summarized hereinabove will become more apparent from a perusal of the following detailed description of the devices illustrated in the accompanying drawings wherein:

FIG. 4 is a diagrammatic side elevational view similar to FIG. 2 of a two-port delay line utilizing a non-piezoelectric medium, FIG. 5 is a diagrammatic perspective view similar to FIG. 1 of another modified embodiment of the invention wherein the acoustic beam follows a helical path, FIG. 6 is a fragmentary plan view diagrammatically indicating the disposition of one transducer of the FIG. 4 structure and the resultant acoustic beam disposition, and FIG. 7 is a diagrammatic perspective view similar to FIG. 5 of an acoustic delay line with a helical beam configuration and incorporating additional amplification means.

DETAILED DESCRIPTION OF THE EXEMPLARY EMBODIMENTS OF THE INVENTION

Figure 1:
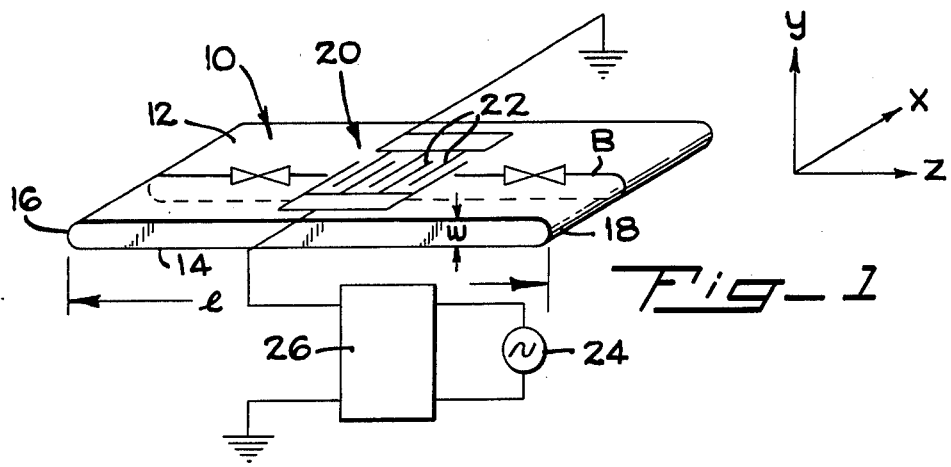
FIG. 1 is a perspective diagrammatic view of an acoustic surface wave device constituting one embodiment of the invention with the external circuitry shown in block diagram form.

With initial reference to FIG. 1, the invention is embodied in a simple closed-loop acoustic wave delay line including an acoustic wave propagating medium in the form of a flat plate-like piezoelectric crystal 10 whose upper and lower faces 12, 14 lie in parallel planes which are joined by radiused end faces 16, 18, the essential characteristic of each end face being that the radius of curvature be greater than approximately two acoustic wave lengths so that an acoustic surface wave can propagate around the end faces with negligible loss, and without appreciable reflection or scattering into bulk waves. If the radius of curvature becomes smaller, losses increase rapidly and the practical minimum should be retained at two acoustic wavelengths or more.

In the case of an acoustically anisotropic crystal, the line generator of the radiused end faces 16, 18 should be perpendicular to a major crystal axis but it is not essential that the end faces be semi-cylinders as illustrated so long as the requirements as to the minimal radius of curvature and disposition relative to the major crystal axis are observed. By way of specific example, if the crystal be a crystal of piezoelectric lithium niobate, the parallel upper and lower faces are Y cut and the line which generates the connecting end faces 16, 18 will be precisely perpendicular to the Z axis as diagrammatically indicated in FIG. 1. As in the case of any surface wave propagating medium, both the upper and lower faces 12, 14 and the two end faces 16, 18 are highly polished to avoid dispersion or unnecessary attenuation of the acoustic energy.

A bi-directional acoustic beam B is established on the described piezoelectric crystal 10 through utilization of a standard interdigital electrode transducer 20 of the type described in detail in the previously mentioned article entitled, DESIGN OF SURFACE WAVE DELAY LINES WITH INTERDIGITAL TRANSDUCERS which is capable of ready formation on the upper face 12 of the piezoelectric crystal by the evaporization of a thin gold layer thereon in the illustrated interdigital configuration so that the individual finger electrodes 22 of the transducer 20 are parallel to the straight line generators of the end faces of the pieezoelectric crystal. Since the bi-directional beams B leave the transducer in perpendicular relation to the transducer finger electrodes 22 along a major crystal axis on the upper face 12, which in the case of the mentioned lithium niobate crystal, preferably would constitute the strong coupling direction, the Z axis, they will both pass around the end faces 16, 18 of the crystal while remaining in the Y–Z plane. Ultimately, both beams B pass around the entire periphery of the crystal in such plane so as to return to the transducer 20 in precise perpendicularity to the transducer finger electrodes 22.

A pulse of electromagnetic energy is delivered from a standard signal generator indicated at 24 through a suitable impedance matching network 26 and will accordingly pass completely around the periphery of the crystal 10 in both directions and will then generate an echo signal at a time, T, representative of the total transit time around the crystal loop. If precise matching conditions are met, all energy will be extracted upon arrival of the delayed signal at the transducer but if different matching conditions are established, only a fraction of the signal energy will be extracted upon each round trip and the remaining energy will be once again propagated around the crystal 10 so that, ultimately, a series of echo signals will appear at the transducer in timed sequence separated by the closed loop transit time, T.

As previously indicated, the acoustic beam B is propagated along a major crystal axis of the piezoelectric crystal 10 from the interdigital transducer 20, which inherently allows a broad bandwidth, which as previously indicated, constitutes a practical limitation existent in a delay line of the type generally described. If one, in turn, desires a large value of delay time, it is obviously necessary that a multiple number of transits around the crystal 10, as illustrated in FIG. 1, are necessary which, in turn, introduces the problem of transverse containment of the acoustic beam B. Obviously, if the acoustic surface wave beam B undergoes excessive lateral spreading during its propagation, it will not be properly collected by the transducer 20. Accordingly, it is preferred to utilize piezoelectric crystals such as the described lithium niobate with high anisotropy which is known to have a focusing effect on the acoustic surface wave beam as discussed in the article entitled, PROBING OF ELASTIC SURFACE WAVES IN PIEZOELECTRIC MEDIA, by B. A. Richardson and G. S. Kino, Applied Physics Letters, Jan. 15, 1970, 16, 2 pp. 82–84 to which reference is made for details. Generally, however, the strength of this focusing effect, for example, in lithium niobate, which has high anisotropy, is such as to allow delays in the hundreds of microseconds without incurring more than a very minor insertion loss due to the diffraction spreading. Furthermore, the transverse confinement or focusing of the beam through the crystalline anisotropy effect will not introduce dispersion, mode conversion, attenuation or other undesirable side effects.

A specifically fabricated and tested structure, as generally shown in FIG. 1 included a lithium niobate crystal 10 having an overall length, 1, of 1.419 inches and a thickness, w, of 0.117 inch. The upper and lower faces 12, 14 were formed by Y-cut parallel planes and the end faces 16, 18 of the crystal 10 were in the form of semi-cylinders whose radius of curvature accordingly was 0.058 inch. The transducer 20 was formed on the upper face 12 of the crystal 10 of the type hereinabove described with the finger electrodes 22 in precise parallelism with one another and with the line generator of the end faces 16, 18 and perpendicular to the Z axis of the crystal 10.

An input electromagnetic signal of approximately 1 milliwatt and at a frequency of 100 MHz was delivered from the signal generator 24 through the matching network 26 to the transducer 20 so as to establish acoustic beams B traveling in both directions therefrom with a width of approximately 0.050 inch along the Z axis of the crystal. Both beams B made multiple transits around the closed loop in the Y-Z plane of the crystal to produce echo signals at the transducer 20 whose delay times were measured. One full transit around the entire closed loop required approximately 23 microseconds and echo signals after 5 successive transits around the closed loop corresponded with a measured time delay of approximately 115 microseconds. Such measured values are in close agreement with the known propagation velocity of acoustic waves along the Z axis of a lithium niobate crystal which is approximately $3.485 \times 10^5$ cm./sec.. It may be noted that a slightly higher propagation velocity exists as the acoustic beams B travel around the end faces 16, 18 but such increase which is approximately 2 per cent and occurs over a relatively short distance provided a time deviation less than the accuracy of measurement. It has also been shown by calculation that during propagation of a wave around the end faces of a lithium niobate crystal, it propagates as a pseudo-surface wave but as long as such propagation remains in the Y-Z plane of the crystal, the wave remains non-radiative and thus lossless.

It is also known that certain piezoelectric crystals such as lithium niobate have a very high Q at microwave frequencies (e.g.> 1,000) thus suggesting the possibility of narrow band filtering action. By appropriate choice of design parameters, the FIG. 1 structure can so function. Quite simply, if the distance around the closed loop of the crystal 10 is designed to be an integral number of acoustic wave lengths at a particular frequency, a resonance condition for the acoustic waves traveling in both directions from the transducer 20 is obtained thus to provide what may be denominated a closed-loop resonator filter, analogous to the standard resonant cavity filter. Furthermore, the transducer 20, itself, can be specifically designed to couple to the particular resonant frequency.

In the FIG. 1 structure generally described hereinabove, but a single transducer 20 was utilized as the transmitting and receiving transducer but it is obvious that separate transmitting and receiving transducers can be utilized in a slightly modified embodiment of the invention corresponding generally to a standard two-port surface wave delay line, a diagrammatic illustration of a structure of this type being shown in FIG. 2.

In a standard two-port delay line the basic irreducible minimum two-port insertion loss is 6 dB and the basic triple transit suppression has a maximum limit of 12 dB, as discussed in detail in the previously mentioned article, DESIGN OF SURFACE WAVE DELAY LINES WITH INTERDIGITAL TRANSDUCERS. However, in accordance with another significant aspect of the present invention, appropriate positioning of the transmitting and receiving transducers on a piezoelectric crystal can be utilized to provide an insertion loss with a theoretical minimum of zero and a corresponding triple transit suppression with a theoretical maximum limit of infinity. The foregoing, of course, refers to ideal conditions and, as a practical matter, because of dissipative losses of both acoustic and electrical nature, the actual insertion loss and triple transit suppression will be finite.

The slightly modified arrangement which provides for this extremely advantageous result is diagrammatically illustrated in FIG. 2 wherein the transmitting transducer 50 is located on the upper face 52 of a piezoelectric crystal 54 which crystal may be generally similar to that described in connection with the structure of FIG. 1 with parallel upper and lower faces 52, 53 and semicylindrical end faces 56, 58. The transmitting transducer 50 is oriented so that an input electromagnetic signal delivered thereto through a matching network 60 generates acoustic beams B traveling in both directions from the transducer along a major crystalline axis (Z axis in the case of lithium niobate, as previously described) and remaining in a symmetry plane during the entire closed loop transit around the crystal. The receiving transducer 62 is, in turn, located on the lower face 53 of the crystal in alignment with the generated beams so as to be capable of optimal reception thereof and is, in turn, connected through an electrical matching circuit 64 to an output load. More particularly, the receiving transducer 62 is positioned at a point which will be referred to as the equal phase point. This point is one where the "acoustic" distance between the transmitting and receiving transducers 50, 62, in both clockwise and counterclockwise directions, is the same to a fraction of an acoustic wave length so that the acoustic beams arrive at the receiving transducer from opposite directions but with the same instantaneous phase. If such equal phase condition is met, the energy in the two beams will add and transfer to the output load. However, the transmitted and reflected energy from the two acoustic beams, because of the equal phase condition, will cancel. Thus, all of the acoustic energy theoretically is delivered through the receiving transducer 62 to the load, thus to realize the theoretical zero insertion loss characteristic and because of the cancellation of the transmitted and reflected energy in the receiving transducer, an infinite triple transit suppression factor is provided.

Figure 2:
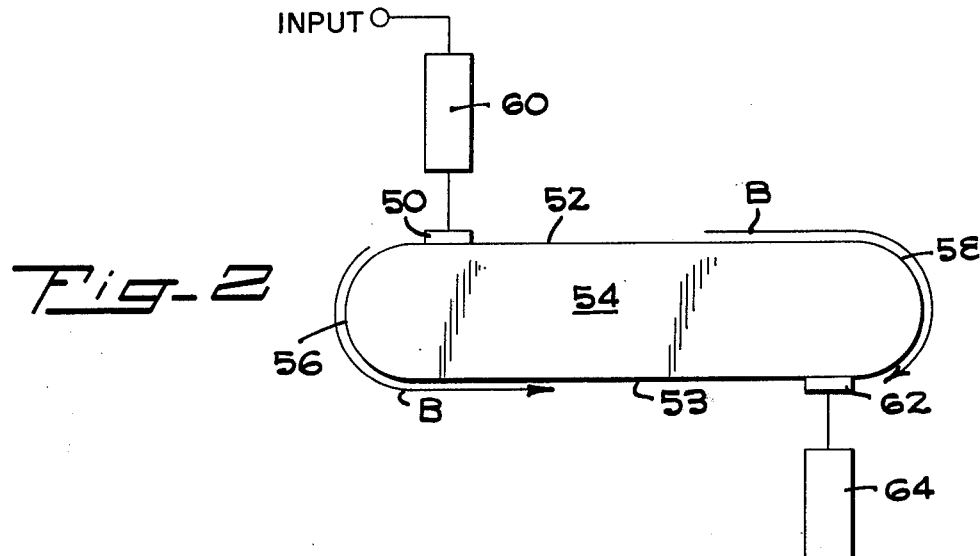
FIG. 2 is a diagrammatic side elevational view of a slightly modified embodiment of the invention in the specific form of a two-port delay line.
Figure 3:
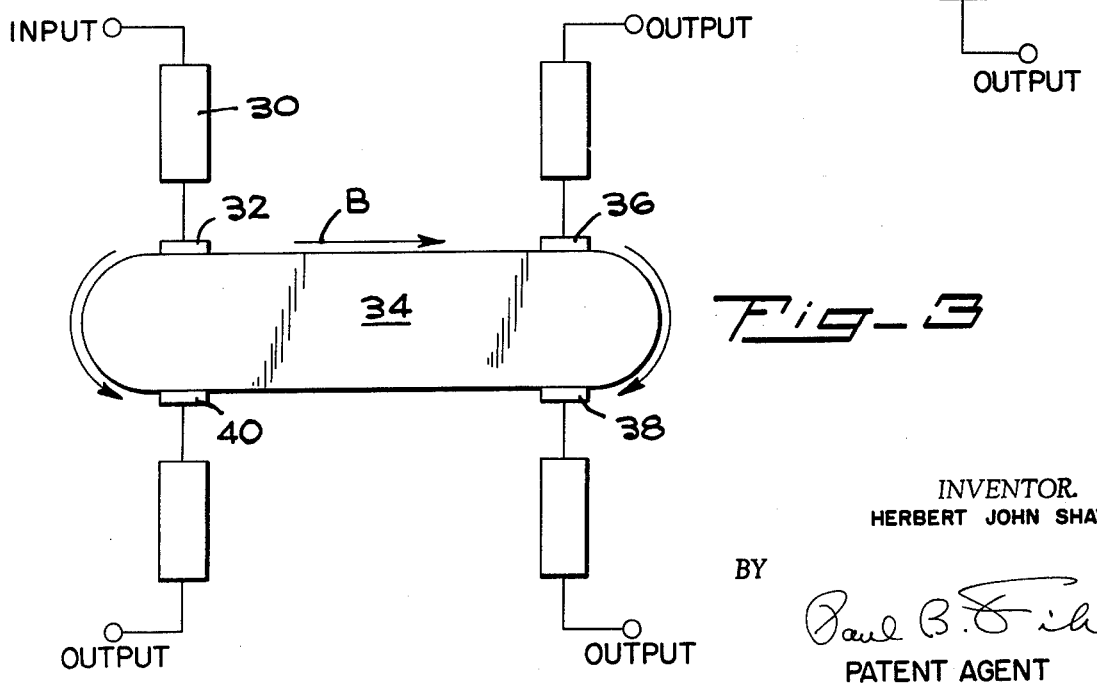
FIG. 3 is a diagrammatic side elevational view similar to FIG. 2 showing another embodiment of the invention with a multi-port transducer arrangement, providing a tapped delay line.

In each of the described embodiments of FIG. 1 and 2, the attainable delay times resultant from one or more wave transits of the crystal are obviously separated by the mentioned single transit time factor, T, but incrementally variable time delays are readily attained by the simple addition of a multiplicity of output ports or taps along the closed loop propagation path of the acoustic beam. As shown in FIG. 3, an input signal is delivered through a matching network 30 to an input or transmitting transducer 32 to generate an acoustic surface wave beam B which, as in the prior embodiments follows a closed loop recirculating path around a piezoelectric crystal 34. At spaced intervals along this path, three receiving or output transducers 36,38,40 are positioned wherefore the arrival times of an acoustic signal will vary with intervals less than the full transit time. Appropriate connection of a load to a selected receiving transducer will provide the incrementally variable time delay. Alternatively and of significance in signal processing, the outputs of the three transducers or taps 36,38,40 can be simultaneously received and recorded to provide a tapped delay line enabling analysis of a complex waveform delivered to the input transducer 32.

In each of the three embodiments of the invention described hereinabove, the electromagnetic signals were introduced to transducers on piezoelectric crystals so that the generated electric fields in the transducers, in turn, established the described acoustic surface wave beams. It is generally known that acoustic surface waves can be propagated in non-piezoelectric materials which do, however, have the requisite elastic characteristics to provide for such propagation, common examples being fused quartz, rutile and sapphire as mentioned hereinabove. Furthermore, like the described piezoelectric crystals, such non-piezoelectric propagating materials also allow propagation of the acoustic surface waves around radiused end faces so long as the minimal radius of curvature condition is met as discussed in detail hereinabove.

Accordingly, the principles of the present invention can be embodied in a further modified embodiment of the invention as illustrated in FIG. 4 wherein a closed-loop fused quartz plate 70 has established therein a propagating acoustic beam B by utilization of transducers 72, 74 of the so-called "wedge" type as shown by Viktorov in FIG. 5c on page 10 of his book entitled, RAYLEIGH AND LAMB WAVES: PHYSICAL THEORIES AND APPLICATIONS, (Plenum Press, 1967). Briefly, an input signal is applied to a bulk-wave piezoelectric crystal 76 forming part of the transducer 72 for transfer as a bulk wave through an elastic (non-piezoelectric) wedge 78 to generate the acoustic surface wave beam B in the elastic wave propagating plate 70. The established acoustic surface wave beam B travels through the material to the similar receiving transducer 74 in substantially the same fashion as described hereinabove and depending upon the coupling characteristics of the transducers 72, 74, one or more transits of the closed loop of the sample 70 can be attained thus ultimately to provide an equivalent large time-bandwidth product of the delay line.

In each of the first three embodiments of the invention described with respect to FIGS. 1, 2 and 3, the interdigital transducers were arranged with their finger electrodes in perpendicular relation to a major crystal axis (e.g. the Z axis in case of lithium niobate, as specifically noted) and as a consequence the acoustic beams followed a path which formed a closed loop and successive transits of the beams around the crystal followed the same path. Such closed loop transit of the piezoelectric crystals is not a necessary condition and by appropriate disposition of the transducers the acoustic beam can be caused to follow essentially a helical path with successive transits of the acoustic beam disposed in spaced parallelism on the crystal. This general concept can be explained more readily by reference to FIG. 5 wherein a piezoelectric crystal 80 of lithium niobate is shown in a diagrammatic perspective illustration similar to FIG. 1 again in the form of a flat plate-like structure with parallel upper and lower faces 82, 84 and semi-cylindrical end faces 86, 88. However, the interdigital transmitting and receiving transducers 90, 92 are disposed at the upper left and lower right respectively of the upper face 82 of the crystal 80 and are slightly angled with respect to the major crystalline axis. Accordingly, if an input signal is applied to the transmitting transducer 90 at the upper left, one of the acoustic beams B generated thereby follows the flattened helical path illustrated to make a multiplicity of transits in spaced parallelism around the crystal to eventually be received by the receiving transducer 92 at the lower right of the Figure. It may be noted that the second acoustic beam generated by the transmitting transducer will be established in a helical path in the opposite direction and would be absorbed by placing a standard absorbing material on the surface. However, it will be immediately obvious that the transmitting transducer 90 could be placed in the central portion of the crystal and two receiving transducers could be utilized if desired for reception of the energy in both helical beams.

By way of specific example, if in the structure as shown in FIG. 5, the transmitting transducer 90 is arranged to generate an acoustic beam B with a width of 0.025 inch and the helical path is defined so that a buffer zone of equivalent width is left between adjacent turns of the helical beam, 20 complete transits could occur on a crystal whose face dimensions are merely one inch by one inch and assuming a time delay of the order of 20 microseconds for each helical turn, a total time delay on this relatively small structure of 400 microseconds can be attained.

In this modified embodiment of the invention, the piezoelectric crystal can be fabricated much in the same fashion as those described in connection with the three piezoelectric crystals in FIGS. 1, 2 and 3, that is, the upper and lower faces 82, 84 are cut and polished in parallel planes and the end faces 86, 88 are in the form of semi-cylinders whose straight line generator is perpendicular to a major crystal axis and the radius of curvature is above the stated minimum to assure propagation of the acoustic beams therearound without loss.

As generally indicated, to generate the helical beam B as shown in FIG. 5, the transducer 90 must be disposed at an angle to the major crystal axis. By way of example, if lithium niobate is the crystal, the major crystal axis would be the Z axis of the crystal. Such major crystal axis is indicated at 94 in FIG. 6 which constitutes a fragmentary plan view of the crystal 80 adjacent the transmitting transducer 90 and the transducer itself is angularly situated to have an axis 96 displaced from the crystal axis by the angle $\theta$. When a signal is applied to the transducer 90, because of the crystalline anisotropy of the crystal the generated acoustic beam does not travel along the transducer axis 96 but in a direction 98 at some lesser angle $\phi$ relative to the crystal axis 94 which is determined by the general material of the crystal. For example, in the case of lithium niobate, it has been determined by computation that if the transducer angle $\theta$ is 4°, the high anisotropy of lithium niobate provides for a propagating beam at an angle $\phi$ of approximately 2° relative to the Z axis of the lithium niobate crystal. It should be mentioned that the phase velocity vector rotates through the same angle $\theta$ as the transducer axis 96 but the group velocity representing the beam energy only is displaced through the smaller angle $\phi$. These results will vary with the particular piezoelectric material. By way of example, if a bismuth germanium oxide crystal is utilized, a lesser angle displacement of the transducer is requisite to give essentially the same helical path of the acoustic beam. Additionally, it should be mentioned, as will be apparent, that if the material be isotropic, the beam axis will coincide with the transducer axis and appropriate disposition of the transducer on such an isotropic sample will take this fact into account in determining the helical path which the acoustic beam will follow.

While only one output transducer 92 is illustrated in FIG. 5, it is obvious that a plurality of transducers or output taps can be positioned along the helical acoustic beam path in a fashion analogous to that described with respect to FIG. 3 and such an arrangement will provide a multi-tap delay line enabling precise analysis of lengthy and complex input signals delivered to the input transducer 90.

It will be immediately obvious that stacks of the helical beam delay line units, as shown in FIG. 5, can be utilized with appropriate electrical connection from the receiving transducer of one delay line to the transmitting transducer of the next to basically add the delay times of the multiple units so that time delays in the order of milliseconds are readily obtainable with a relatively small "package." Furthermore, because of the broad band characteristics of the transducers as mentioned hereinabove, extremely large time-bandwidth products are obtainable.

In any acoustic surface wave delay line, the character of the acoustic surface wave propagating material (e.g. its surface polish) and the character of the transducers all contribute to certain practical losses. Since such losses will increase with the propagating distance, an extremely long delay line of the type described hereinabove will increase such losses which obviously increase with the distance traversed by the acoustic surface wave. Accordingly, in accordance with another aspect of the present invention, a simple modification of the structure shown in FIG. 5 and described hereinabove wherein the acoustic beam does traverse an extremely lengthy path will enable amplification of the acoustic surface wave thus to offset the mentioned losses and even obtain a net gain if required. A structure incorporating an amplifying means is illustrated in FIG. 7 and is generally of the type described in an article entitled, "SURFACE WAVE DELAY LINE AMPLIFIERS," by K.M. Lakin and H.J. Shaw IN THE TRANSACTIONS IEEE, MTT-17, No. 11, pg. 912 in Nov. 1969.

The basic delay line structure of FIG. 7 provides the helical beam configuration as discussed hereinabove with respect to FIG. 5 and corresponding parts thereof will accordingly be indicated by corresponding numerals with an added prime notation to provide differentiation. Additionally, the description of the transducer 90', 92' and the piezoelectric crystal 80' and the manner of its general delay line operation will not be repeated since they are substantially the same.

The amplifying means of the general type described in detail in the mentioned article specifically includes parallel strips 100 of dielectric material such as silicon oxide deposited on opposite sides of the acoustic beam with an overlaid and spaced strip 102 of a semiconductor film such as expitaxial silicon deposited on a sapphire substrate. Direct current voltages applied by suitable ohmic contacts 104 to the end of the silicon strip 102 create drifting carriers which as explained in detail in the mentioned article interact with the propagating acoustic surface wave beam to provide the amplification mechanism. As specifically illustrated in FIG. 7, one of the amplifying means is placed adjacent the acoustic beam during each transit of its upper face and similar units can be similarly disposed on the lower face, the number of amplifying means being, of course, dependent upon the losses encountered and the resultant necessary amplification. It should be observed that since a long helical beam path is provided, a considerable number of amplifying means can be employed and regardless of the delay function, the structure diagrammatically illustrated in FIG. 7 can form, again in a relatively small package, an excellent acoustic surface wave amplifier.

It is particularly useful, however, in the delay line application because it eliminates the need for external amplifiers which require additional transducers which inherently will introduce bandwidth limitations so that the ultimately desirable characteristic of a large time-bandwidth product would be diminished by the incorporation of such external amplifiers. Additionally, the amplifier units as described hereinabove also are known to have a focusing and steering effect thus to further reduce beam spreading or misalignment in the long delay lines of the type described, thus to supplement the previously described focusing and steering effects due to crystalline anisotropy.

It should be noted that any of the structures described in FIGS. 2–7 can, like the FIG. 1 structure, be designed to function as filters by merely designing the beam path to have a distance between the transmitting and receiving transducers equal to an integral number of acoustic wavelengths, thus to establish the requisite resonance condition.

Various further modifications and/or alterations can be readily envisioned within the general spirit of the invention, and the foregoing description of several embodiments is not to be considered in a limiting sense and the actual scope of the invention is indicated only by reference to the appended claims.

What is claimed is:

1. A circulating acoustic surface wave device which comprises, an anisotropic elastic medium formed to enable propagation of an acoustic surface wave around its peripheral surface, and means for establishing an acoustic surface wave on said elastic medium so as to propagate therearound.

2. A circulating acoustic surface wave device according to claim 1 wherein, the peripheral surface of said medium along which the acoustic wave propagates has at no point a radius of curvature less than two acoustic wavelengths.

3. A circulating acoustic surface wave device according to claim 1 wherein, said elastic medium constitutes a piezoelectric crystal.

4. A circulating acoustic surface wave device according to claim 3 wherein, said piezoelectric crystal has high crystalline anisotropy.

5. A circulating acoustic surface wave device according to claim 3 wherein, said wave establishing means includes an interdigital transducer disposed on said piezoelectric crystal to generate an acoustic surface wave beam along a major crystal axis.

6. A circulating acoustic surface wave device according to claim 1 wherein, said wave establishing means forms an acoustic beam in a direction to propagate around said medium in a closed loop.

7. A circulating acoustic surface wave device according to claim 6 wherein, said wave establishing means includes a single transducer arranged to generate the acoustic beam and to receive echo signals separated by the transit time of the beam around said propagating medium.

8. A circulating acoustic surface wave device according to claim 6 wherein, the closed loop along which the acoustic beam propagates has a length equal to an integral number of acoustic wavelengths.

9. A circulating acoustic surface wave device according to claim 6 wherein, said wave establishing means includes a first transducer and which comprises, a second transducer disposed along the closed loop to receive time-delayed signals from the propagating wave.

10. A circulating acoustic surface wave device according to claim 9 wherein, said first transducer establishes acoustic beams propagating in both directions along the closed loop path to said second transducer and wherein the acoustic distance in both directions is equal wherefore the two acoustic beams arrive at said second transducer with the same instantaneous phase.

11. A circulating acoustic surface wave device according to claim 1 which comprises, amplifying means arranged adjacent the propagation path of the acoustic surface wave.

12. A circulating acoustic surface wave device according to claim 11 wherein, said amplifying means includes a semiconductor strip extending along the direction of acoustic wave propagation, and means for applying a direct current voltage on said strip to generate drifting carriers therealong.

13. A circulating acoustic surface wave device which comprises an anisotropic elastic medium formed to enable propagation of an acoustic surface wave around its peripheral surface, means including a transmitting transducer angularly disposed on the peripheral surface of said elastic medium relative to a major axis for establishing an acoustic surface wave beam which propagates along a generally helical path, and a receiving transducer disposed on said medium along said helical path to intercept the acoustic beam.

14. A circulating acoustic surface wave device according to claim 13 wherein, said transmitting transducer is disposed so that adjacent turns of the acoustic beam along its helical path are separated by a distance of the order of the beam width.

15. A circulating acoustic surface wave device according to claim 13 which comprises, amplifying means disposed along said beam path at a plurality of positions.

* * * * *